(12) United States Patent
Jacob Da Silva et al.

(10) Patent No.: US 10,715,411 B1
(45) Date of Patent: Jul. 14, 2020

(54) ALTERING NETWORKING SWITCH PRIORITY RESPONSIVE TO COMPUTE NODE FITNESS

(71) Applicant: Lenovo Enterprise Solutions (Singapore) Pte. Ltd., Singapore (SG)

(72) Inventors: Roberto Henrique Jacob Da Silva, Oak Park, CA (US); Makoto Ono, Chapel Hill, NC (US); Chidambaram Bhagavathiperumal, Livermore, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/278,115

(22) Filed: Feb. 17, 2019

(51) Int. Cl.
*H04L 12/26* (2006.01)
*H04L 29/12* (2006.01)
*H04L 29/08* (2006.01)

(52) U.S. Cl.
CPC .......... *H04L 43/0811* (2013.01); *H04L 43/10* (2013.01); *H04L 61/10* (2013.01); *H04L 61/6022* (2013.01); *H04L 67/12* (2013.01)

(58) Field of Classification Search
CPC ..... H04L 43/0811; H04L 43/10; H04L 61/10; H04L 61/6022; H04L 67/12
See application file for complete search history.

(56) References Cited

U.S. PATENT DOCUMENTS

| | | | | |
|---|---|---|---|---|
| 9,491,121 B2* | 11/2016 | Bao | ......................... | H04L 49/25 |
| 2016/0197853 A1* | 7/2016 | Kumar | .................... | H04L 49/15 370/389 |
| 2016/0212040 A1* | 7/2016 | Bhagavathiperumal | ..................... | H04L 45/16 |
| 2017/0208077 A1* | 7/2017 | Freedman | ......... | G06F 16/24568 |

* cited by examiner

*Primary Examiner* — Kyaw Z Soe
(74) *Attorney, Agent, or Firm* — Jeffrey Streets

(57) ABSTRACT

An apparatus includes a local compute node connected to a first networking switch by a direct local link. The first switch reduces its priority in response to determining that that the first networking switch is currently unable to establish the bi-directional communication with the local compute node through the direct local link. If the reduced priority of the first networking switch is greater than a priority of each of at least one additional networking switch in a cluster, then the first networking switch operates as a master networking switch for the cluster. If the reduced priority of the first networking switch is less than the priority of any of the at least one networking switch, then the first networking switch operates as a standby networking switch and one of the atleast one additional networking switch having the highest priority is operated as the master networking switch for the cluster.

20 Claims, 8 Drawing Sheets

ALTERING NETWORKING SWITCH PRIORITY RESPONSIVE TO COMPUTE NODE FITNESS

BACKGROUND

The present disclosure relates to an edge server having an embedded networking switch and methods of operating the networking switch in an edge server cluster.

BACKGROUND OF THE RELATED ART

The Internet of Things (IoT) is a network of physical devices with embedded electronics, software, sensors, actuators and connectivity that enables these physical devices to connect, collect and exchange data. The Internet of Things is driving new demand for computing outside the Data Center. The concept of IoT is based on data collection, data analysis and taking intelligent action as a result of the analysis. One IoT framework focuses on data collection and forwarding. For example, an IoT end point device, such as an intelligent camera, or a gateway device collects data from one or more sensors and forwards the collected data to the cloud where most of the data processing is performed. In other words, computing devices at the edge of the IoT environment manage data collection and forwarding functions of the system, and the computing device in the cloud manage the data analysis and data storage functions. However, such a system may suffer from high latency, high bandwidth consumption, poor security, poor availability or poor connectivity.

BRIEF SUMMARY

Some embodiments provide a computer program product comprising a non-volatile computer readable medium and non-transitory program instructions embodied therein, the program instructions being configured to be executable by a processor to cause a first networking switch to perform certain operations. Those operations comprise identifying a priority of the first networking switch with respect to at least one additional networking switch that is in a cluster with the first networking switch, determining whether the first networking switch is currently able to establish bi-directional communication with a local compute node through a direct local link, and reducing the priority of the first networking switch in response to determining that that the first networking switch is currently unable to establish the bi-directional communication with the local compute node through the direct local link. The operations further comprise determining whether the reduced priority of the first networking switch is greater than a priority of each of the at least one additional networking switch in the cluster, operating the first networking switch as a master networking switch in the cluster in response to determining that the reduced priority of the first networking switch is greater than the priority of each of the at least one networking switch in the cluster, and operating the first networking switch as a standby networking switch in response to determining that the reduced priority of the first networking switch is less than the priority of any of the at least one networking switch in the cluster.

Some embodiments provide an apparatus comprising a local compute node and a first networking switch including a first port coupled to the compute node via a direct local link, a second port coupled to a gateway device via a first access link, and a third port coupled to a cloud via a first uplink. The first networking switch is configured to perform operations comprising identifying a priority of a first networking switch and a priority of at least one additional networking switch that is in a cluster with the first networking switch, determining whether the first networking switch is currently able to establish bi-directional communication with a local compute node through a direct local link, and reducing the priority of the first networking switch in response to determining that that the first networking switch is currently unable to establish the bi-directional communication with the local compute node through the direct local link. The first networking switch is configured to perform operations further comprising determining whether the reduced priority of the first networking switch is greater than a priority of each of the at least one additional networking switch in the cluster, operating the first networking switch as a master networking switch in the cluster in response to determining that the reduced priority of the first networking switch is greater than the priority of each of the at least one networking switch in the cluster, and operating the first networking switch as a standby networking switch in response to determining that the reduced priority of the first networking switch is less than the priority of any of the at least one networking switch in the cluster.

DETAILED DESCRIPTION

Figure 1:
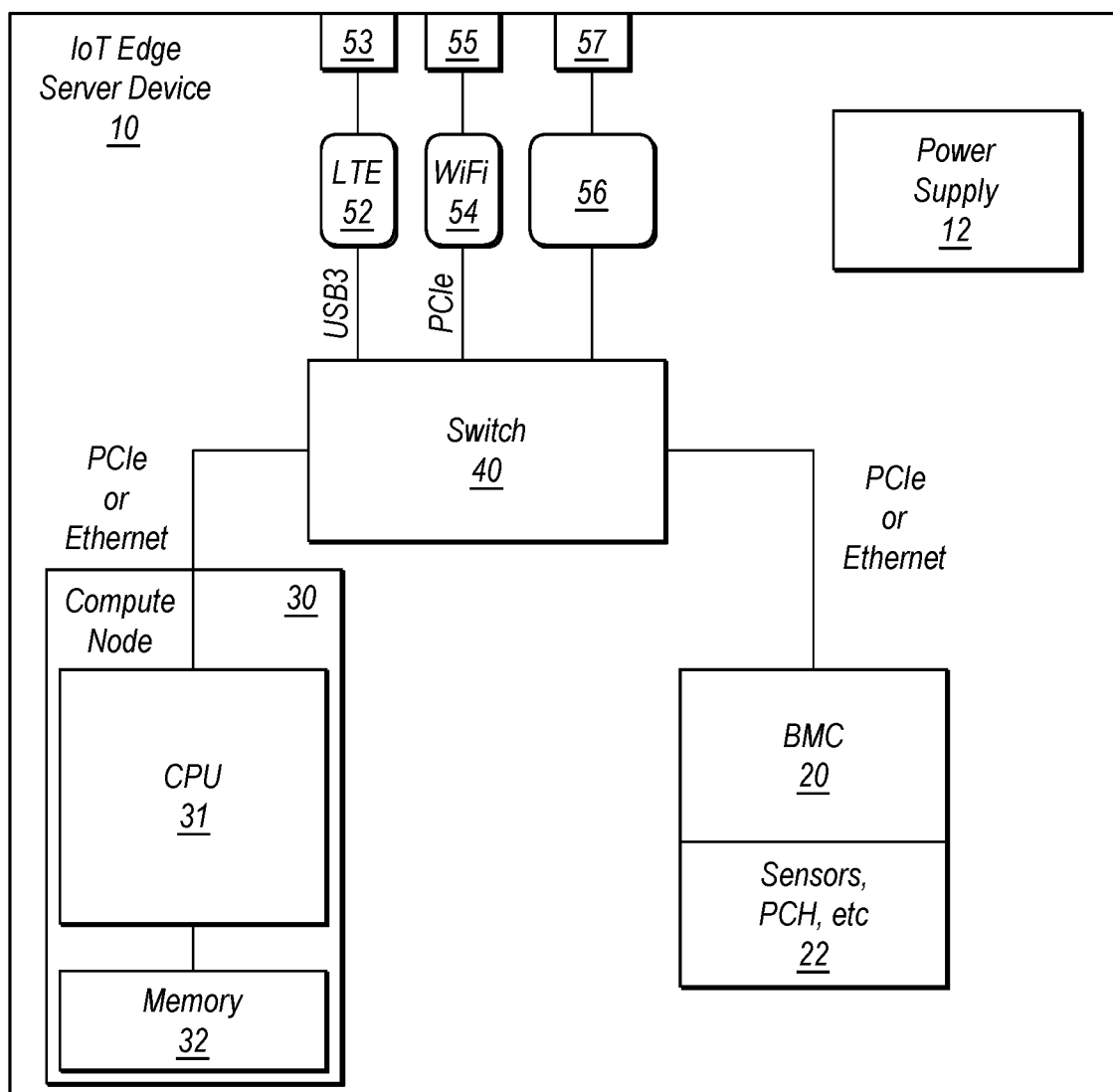
FIG. 1 is a diagram of an Internet of Things (IoT) edge server device having an embedded switch that provides wired and wireless network connections to a central processing unit (CPU) and a management processor, such as a baseboard management controller (BMC) according to some embodiments.

Some embodiments provide a computer program product comprising a non-volatile computer readable medium and non-transitory program instructions embodied therein, the program instructions being configured to be executable by a processor to cause a first networking switch to perform certain operations. Those operations comprise identifying a priority of the first networking switch with respect to at least one additional networking switch that is in a cluster with the first networking switch, determining whether the first networking switch is currently able to establish bi-directional communication with a local compute node through a direct local link, and reducing the priority of the first networking switch in response to determining that that the first networking switch is currently unable to establish the bi-directional communication with the local compute node through the direct local link. The operations further comprise determining whether the reduced priority of the first networking switch is greater than a priority of each of the at least one additional networking switch in the cluster, operating the first networking switch as a master networking switch in the cluster in response to determining that the reduced priority of the first networking switch is greater than the priority of each of the at least one networking switch in the cluster, and operating the first networking switch as a standby networking switch in response to determining that the reduced priority of the first networking switch is less than the priority of any of the at least one networking switch in the cluster.

In accordance with various embodiments of the computer program product, the program instructions may be configured to be executable by a processor to cause the first networking switch to perform various operations. It should be understood that any of the operations performed by the first networking switch may be caused by a processor executing those program instructions. In the following discussion of the operations performed by the first networking switch, the operations described may be attributed to the program instructions executable by a processor whether or not the operations are specifically stated as being the result of program instructions configured to be executable by a processor to cause the first networking switch to perform the described operations.

In some embodiments, the first networking switch may transmit a message from the first networking switch to the at least one additional networking switch, wherein the message transmitted to the at least one additional networking switch indicates the reduced priority of the first networking switch. The first networking switch may also receive a message from each of the at least one additional networking switch, wherein the message received from each of the at least one additional networking switch indicates the priority of the additional networking switch from which the message is received.

In some embodiments, the first networking switch may receive an address resolution protocol request message broadcast from a gateway device. If the first networking switch is being operated as the master networking switch in the cluster, then the first networking switch will send an address resolution protocol response message to the gateway device in response to receiving the address resolution protocol request message. The address resolution protocol response message identifies a media access control address that the gateway device should use in a packet header as a destination address. Conversely, if the first networking switch is not being operated as the master networking switch in the cluster, such as if the first networking switch is being operated as a standby networking switch, then the first networking switch will not send an address resolution protocol response message to the gateway device in response to receiving the address resolution protocol request message.

In some embodiments, the priority of a networking switch may be represented by a priority number. Therefore, the first networking switch may reduce its priority by subtracting a predetermined number from a predetermined priority number representing the priority of the first networking switch. Furthermore, the first networking switch may identify a priority of the first networking switch and the priority of the at least one additional networking switch by reading a configuration file that includes a predetermined priority of each of the networking switches. While the configuration file may provide a predetermined priority for each addition networking switch, messages received from each of the at least one additional networking switch may be important as they may indicate that there has been a reduction in the priority of the additional networking switch from which the message is received. As with the first networking switch, any of the additional networking switches may reduce their priority from time to time if their own fitness protocol determines that the additional networking switch is unable to establish bi-directional communication with the compute node that is connected thereto by a direct local link.

In some embodiments, the first networking switch may perform various operations to determine whether the first networking switch is currently able to establish bi-directional communication with the first local compute node through the first direct local link. In one example, the first networking switch may periodically transmit a heartbeat request to the first local compute node coupled to the first networking switch through the first direct local link and start a fitness timer in response to transmitting the heartbeat request to the first local compute node. The first networking switch then monitors for a heartbeat response from the first local compute node on the first direct local link, wherein the heartbeat response is responsive to the heartbeat request. It may be determined that the first networking switch is currently able to establish bi-directional communication with the first local compute node through the first direct local link in response to the first networking switch receiving a heartbeat response from the first local compute node before expiration of the fitness timer. On the other hand, it may be determined that the first networking switch is currently unable to establish bi-directional communication with the first local compute node through the first direct local link in response to expiration of the fitness timer without the first networking switch receiving a heartbeat response from the first local compute node since starting the fitness timer. In one non-limiting example, the heartbeat request may be an Internet Control Message Protocol (ICMP) echo request message and the heartbeat response may be an Internet Control Message Protocol echo response message. Optionally, the first networking switch may set a heartbeat request transmission timer for a recurring time interval of a predetermined time duration, wherein the first networking switch transmits the heartbeat request in response to expiration of the heartbeat request transmission timer. The fitness timer may be set for a time duration that is greater than the predetermined time duration of the heartbeat request transmission timer. Still further, the heartbeat request is may be transmitted to the first local compute node at an identified IP address that is unique to the local compute node. The first networking switch may restart the fitness timer in response to receiving a heartbeat response from the first local compute node.

In some embodiments, the networking switch may establish a state machine for the purpose of determining and tracking whether the first networking switch is currently able to establish bi-directional communication with the first local compute node through the first direct local link. For example, the state machine may maintain a current state variable comprising a FIT state that is set in response to the networking switch being able to establish bi-directional communication with the local compute node, and comprising an UNFIT state that is set in response to the networking switch being unable to establish bi-directional communication with the local compute node.

Some embodiments provide an apparatus comprising a local compute node and a first networking switch including a first port coupled to the compute node via a direct local link, a second port coupled to a gateway device via a first access link, and a third port coupled to a cloud via a first uplink. The first networking switch is configured to perform operations comprising identifying a priority of a first networking switch and a priority of at least one additional networking switch that is in a cluster with the first networking switch, determining whether the first networking switch is currently able to establish bi-directional communication with a local compute node through a direct local link, and reducing the priority of the first networking switch in response to determining that that the first networking switch is currently unable to establish the bi-directional communication with the local compute node through the direct local link. The first networking switch is configured to perform operations further comprising determining whether the reduced priority of the first networking switch is greater than a priority of each of the at least one additional networking switch in the cluster, operating the first networking switch as a master networking switch in the cluster in response to determining that the reduced priority of the first networking switch is greater than the priority of each of the at least one networking switch in the cluster, and operating the first networking switch as a standby networking switch in response to determining that the reduced priority of the first networking switch is less than the priority of any of the at least one networking switch in the cluster.

The apparatus comprising the local compute node and the first networking switch may perform operations in accordance with any of the disclosed embodiments. For example, the first networking switch may be configured to perform operations as disclosed in reference to an embodiment of a computer program product. It should be recognized that the first networking switch may include a processor and a non-volatile computer readable medium with non-transitory program instructions embodied therein, wherein the program instructions are configured to be executable by a processor to cause a first networking switch to perform certain operations. Since many of the operations performed by the first networking switch have been fully described in reference to the computer program product embodiments, those operations are not being repeated in the context of the apparatus.

Some embodiments provide an Internet of Things (IoT) edge server device comprising a compute node, a management processor, a first network adapter, a second network adapter, and an embedded switch. The embedded switch includes a port coupled to the compute node, a port coupled to the management processor, a port coupled to the first network adapter, and a port coupled to the second network adapter. Furthermore, the embedded switch provides both the compute nodes and the management processor with access to an external device, gateway or network using a selected one of the first and second network adapters. Optionally, the IoT edge server device may include additional network adapters.

The IoT edge server device may have any known computer architecture in addition to the referenced compute node, management processor, first network adapter, second network adapter, and embedded switch. However, the switch may be referred to as an embedded switch because it is integrated into the architecture of the IoT edge server device such that a central processing unit (CPU) of the compute node and the management processor, such as a baseboard management controller (BMC) or integrated management module (IMM), access an external device, gateway or network through the switch. The IoT edge server device may include a motherboard that secures the compute node, the management processor and the embedded switch. In one option, the compute node and the management processor are each coupled to the embedded switch via a high-speed serial computer bus, such as a bus consistent with the Peripheral Component Interconnect Express (PCIe) bus standard. In a further option, the compute node and the management processor may each communicate with the embedded switch using a standard wired network protocol, such as an Ethernet protocol. The connection between the compute node and the switch, as well as the connection between the management processor and the switch, may either be a direct interconnect from the CPU or BMC to the switch or an indirect interconnect from the CPU or BMC through a network card to the switch.

The embedded switch handles all communications between the compute node and the external device(s), gateway(s) or network(s) as well as all communications between the management processor and the external device(s), gateway(s) or network(s). Furthermore, the embedded switch may also be referred as being independent of the compute node and the management processor because the switch can provide network communications to both the compute node and the management processor without being dependent upon either the compute node or the management processor. In other words, the failure of the compute does not prevent the management processor from gaining access to the external device(s), gateway(s) or network(s) through the embedded switch and failure of the management processor does not prevent the compute node from gaining access to the external device(s), gateway(s) or network(s) through the embedded switch. Furthermore, the switch may run device drivers for any of the network adapters such that the network adapters remain operational even if the compute node fails and/or an operating system (OS) being run on the compute node fails.

The IoT edge server device may include multiple network adapters coupled to the embedded switch, such as a first network adapter and a second network adapter. However, the IoT edge server device may include any number of additional network adapters. In one option, the multiple network adapters are each a different type of network adapter, where the network adapters may differ by at least one of a transmission medium, a transmission speed and a transmission protocol. In a non-limiting example of a different transmission medium, the first network adapter may be a wireless network adapter and the second network adapter may be a wired network adapter. In a non-limiting example of a different transmission protocol, the first network adapter may be a wireless local area network adapter and the second network adapter may be a wireless mobile telecommunication network adapter.

The IoT edge server device may further include a power supply coupled to the compute node, management processor, the embedded switch, and the first and second network adapters in order to supply power thereto. In some embodiments, the power supply provides standby power to the embedded switch, the management processor and one or more of the network adapters even if power to the compute node is turned off. Accordingly, the management processor is able to run and to communicate through the embedded switch and one of the network adapters to reach the external device(s), gateway(s) or network(s) so long as the power supply is plugged into a power source. Since the IoT edge server device has a management processor or other management functionality that is always on and can always reach the external network for communication with a remote management node, the IoT edge server device can be remotely managed. Remote management is important since IoT edge server devices may be deployed across numerous disperse locations involved in the IoT environment, such that it is impractical to provide an information technology (IT) expert to manage each of the IoT edge server devices. By implementing remote management in the IoT edge server device, an IT expert can work from a central location to manage any number of the IoT edge server device (s) deployed at any number of locations.

The IoT edge server device may support server class platform management even if the IoT edge server device does not have a wired network connection available. Servers in a datacenter may rely upon a wired network connection for both a data network and a management network, but is cannot be assumed that the same wired network infrastructure will be available in all of the various locations where there may be IoT endpoint devices or gateways. Some embodiments of the IoT edge server device described herein may enable server class platform management even if the local IoT environment only has a wireless network connection. For example, a business office, parts warehouse or personal residence may only have a wireless local area network. Furthermore, the IoT edge server device may have a wide variety of form factors and capabilities, such as a notebook computer, tablet computer, mobile phone, automotive computer, or smart television.

Some embodiments provide a computer program product comprising a non-volatile computer readable medium and non-transitory program instructions embodied therein, the program instructions being configured to be executable by a processor to cause a first networking switch of an IoT edge server device to perform certain operations. The program instructions are executable by a processor of the embedded switch to cause the first networking switch to select one of a plurality of network adapters coupled to the embedded switch for handling communications with external device(s), gateway(s) or network(s), wherein the plurality of network adapters differ by at least one of a transmission medium, transmission speed, or transmission protocol. The program instructions are further executable by the processor of the embedded switch to direct communications between a compute node and the external device(s), gateway(s) or network(s) through the selected network adapter, direct communications between a management processor of the computer and the external device(s), gateway(s) or network(s) through the selected network adapter, and direct communications between the compute node and each of a plurality of external endpoint devices, wherein the communications with each external endpoint device among the plurality of external endpoint devices use any of the plurality of network adapters that are able to establish a connection with the external endpoint device.

The program instructions executable by a processor to select one of a plurality of network adapters coupled to the embedded switch for handling communications with an external network, may include program instructions executable by a processor to select the one of the plurality of network adapters that is currently providing the fastest available link to the external network. While the fastest available link provide the benefit of speed, alternative embodiments may select one of the plurality of network adapters using an alternative criteria, such as reliability or percent up time. In one example where the plurality of network adapters includes a wireless network adapter and a wired network adapter, the wired network adapter may be initially selected on the basis of having a greater speed or bandwidth yet an increasing load on the wired network may lead to a temporary or occasional selection of the wireless network adapter on the basis that the wireless network can currently provide a greater speed or bandwidth. In another example, the plurality of network adapters may include a wireless local area network adapter and a wireless mobile telecommunication network adapter.

Some embodiments of the IoT edge server device may be installed in an IoT environment near one or more external endpoint devices or gateways. In such an installation or application, the communications between the compute nodes and the plurality of external endpoint devices or gateways may include sensor data received from the external endpoint devices. The type of sensor data is not limited and will vary from one sensor or device to another sensor or device. For example, one endpoint device may be a smart oven having a temperature sensor that provides temperature data and a timer that provides remaining cook time data. In another example, an endpoint device may be an industrial actuator having a voltage sensor that provides voltage data and a position sensor that provide position data. In a further example, an endpoint device may be a flow meter having a flow rate sensor that provides flow rate data. Other non-limiting examples of endpoint devices may include smart televisions, wearable devices, smart appliances, home security systems, thermostats, industrial automation and control systems, and the like. Depending upon the type of endpoint devices present at a given location, the communications between the compute node and one of the plurality of external endpoint devices or gateways may further include a control instruction sent from the compute node to the external endpoint devices or gateways.

The communication between the compute node and the one or more external endpoint devices may pass through one or more gateway devices, since the sensors may use a wide variety of communication protocols and transmission media. Accordingly, the sensors may communicate directly with a gateway device using any of a wide variety of protocols, which may include proprietary protocols unique to the individual sensors or sensor manufacturer. Accordingly, the IoT gateway device or multiple IoT gateway devices may aggregate information from one or more IoT endpoint devices, then communicate that information to the IoT edge server device using any of the standard network protocols that are available to the IoT edge server device. In some embodiments, the IoT edge server device may implement multiple standard network protocols, such as Ethernet, TCP/IP, WiFi or LTE.

In some embodiments, the program instructions may be further executable by the processor of the embedded switch to logically bundle each of the links provided by the plurality of network adapters between the embedded switch and an external network, wherein only one of the bundled links supports communication with the external network at any given point in time. Still further, the program instructions may be executable by the processor of the embedded switch to detect failure of a link provided by the selected network adapter and automatically select a different one of the network adapters for handling communications with the external network in response to detecting failure of the currently selected one of the bundled links. Such a process may be referred to as a "failover" between links.

In some embodiments, the program instructions may be further executable by the processor of the embedded switch to logically cluster the IoT edge server device with a second IoT edge server device having a second embedded switch and a second plurality of network adapters coupled to the second embedded switch. Even further, the program instructions may be executable by the processor of the switch to designate one of the embedded switches (herein referred to as the "active" networking switch) to handle network communications for the clustered computers, direct communications between any of the clustered IoT edge server devices and the external network through the designated embedded switch, and automatically designate a different one of the embedded switches (herein referred to as a "standby" networking switch) of the clustered computers to handle network communications for the clustered computers in response to detecting failure of a component of the IoT edge server device that includes the designated ("active") embedded switch, wherein the component is selected from the compute node, the management processor and the embedded switch. Such a process may be referred to as a "failover" between the embedded switches of a cluster of IoT edge server devices. The embedded switch that is currently designated to handle network communication for the clustered IoT edge server devices may be referred to as the "active" switch. To facilitate the use of an active switch for the cluster, the designated embedded switch may use a virtual network address to handle network communications for the clustered IoT edge server devices, wherein each embedded switch within the cluster uses a separate network address for communications with the designated embedded switch. Optionally, the virtual network address may be selected from a virtual media access control address (a level 2 address) and a virtual internet protocol address (a level 3 address).

In some embodiments, the program instructions may be further executable by the processor of the embedded switch to provide network property information to the plurality of network adapters. Accordingly, each of the plurality of network adapters, or at least the selected network adapter, may be fully booted to reach an operational state even without booting the compute node. Therefore, the standby power provided to the management processor, embedded switch and network adapters is sufficient to establish a network connection so that the management processor can communicate with a remote management node.

Some embodiments of the IoT edge server device are suitable to provide edge computing capabilities in an IoT system and to enable use of a management network. The IoT edge server device is closer to the endpoint devices than any cloud resources and may perform some amount of processing and analysis of the data collected from physical endpoint devices without experiencing the amount of latency that is incurred to access the cloud. Optionally, the local edge computer may also perform some aspect of control over the physical endpoint devices. Using the compute resources of the IoT edge server device close to the IoT endpoint devices may lead to a higher level of computing availability (enabling mission-critical applications to be run on the edge computer), a lower level of latency (improving response and control using the edge computer), and a higher level of security and privacy protection (reducing the amount of critical information being transmitted over the network).

The foregoing computer program products may further include program instructions for implementing or initiating any one or more aspects of the methods described herein. Accordingly, a separate description of the methods will not be duplicated in the context of a computer program product. Similarly, the apparatus or system may further process the program instructions to implement or initiate any one or more aspects of the methods described herein.

FIG. 1 is a diagram of an Internet of Things (IoT) edge server device (or "computer") 10 having an embedded switch 40 that provides wired and wireless network connections to a central processing unit (CPU) 31 of a compute node 30 and a management processor 20, such as a baseboard management controller (BMC). The switch 40 is embedded within the computer 10 in the sense that the switch is integrated into the input/output capabilities of the computer 10. If the computer 10 has a housing or enclosure containing the CPU 31 and the management processor 20, then the embedded switch 40 may be contained within the housing or enclosure. Optionally, the embedded switch 40 may be secured to a motherboard that secures the CPU 31 and the management processor 20, or the embedded switch may be secured to an adapter card that is itself secured into a card slot on the motherboard that secures the CPU 31 and the management processor 20. As used herein, the terms "switch" and "networking switch" are intended to encompass a router. The CPU 31 is shown coupled to memory 32 and the management processor 20 is shown coupled to various onboard sensors, a platform controller hub (PCH) or southbridge chip 22.

The embedded switch 40 is coupled to a plurality of network adapters. In the embodiments shown, the embedded switch 40 is coupled to a wireless mobile telecommunication network adapter 52, a wireless local area network adapter 54 and a wired network adapter 56. In the non-limiting example shown, the wireless mobile telecommunication network adapter 52 may implement a Long-Term Evolution (LTE) wireless mobile communication standard, the wireless local area network adapter 54 may implement the WI-FI standard, and the wired network adapter 56 may implement the Ethernet standard, such as Gigabit Ethernet (GbE) or 10 Gigabit Ethernet (10 GbE). The wireless mobile telecommunication network adapter 52 includes an antenna 53, the wireless local area network adapter 54 includes an antenna 55, and the wired network adapter 56 includes a cable connector 57.

The embedded switch 40 is coupled to the CPU(s) 31 and the management processor 20 of the compute node 30 in order to direct communications between those devices 31, 20 and an external network or cloud (not shown) using one or more of the network adapters 52, 54, 56. The embedded switch 40 may be referred to as having a number of input/output "ports", but these ports include connections of any type. For example, a port coupling the CPU 31 to the embedded switch may be a permanent channel or bus that extends from the CPU to the embedded switch without any intermediate components or connections. As another example, a port coupling a network adapter to the embedded switch may, without limitation, be a channel or bus that extends from the embedded switch to an expansion slot where an expansion card that implements the network adapter may be selectively securable. Other configurations of a port may be envisioned and implemented by the embedded switch for establishing or maintaining an input/output connection with a device.

The embedded switch 40 is operational independent of whether the CPU 31 and/or the BMC 20 are currently operational. Since the embedded switch 40 is not dependent upon either the CPU 31 or the BMC 20, the switch may provide network access to either one of the CPU and the BMC even if the other one of the CPU and BMC has not yet booted or has failed. The computer 10 may be deployed in various locations of an IoT environment and may be beneficially deployed at the edge of an IoT network where one or more endpoint devices are in operation. Unlike a data center where a data network and a platform management (BMC) network tend to be separate wired networks, the network infrastructure available to an edge computer may be very different. For example, the edge computing environment may have a wireless network as the only network connection available for both data and platform management.

The wired and wireless network adapters sit behind the embedded switch, such that the network adapters may be abstracted for the CPU and the BMC. Advantageously, the CPU and the BMC do not need to run separate instances of the device drivers for each network adapter. Rather, the embedded switch may have a single instance of the device driver for each network adapter coupled to the embedded switch. Using the embedded switch to load the device drivers for the network adapters provides greater wired/wireless independency from the platform (i.e., the CPU and the OS).

Furthermore, the embedded switch 40, the management processor 20, and the network adapters 52, 54, 56 may receive standby power from a power supply 12, where standby power enables these components to be operational even when main power from the power supply 12 to the computer 10 has not been turned on. Accordingly, the computer 10 is able to be remotely managed so long as the power supply has been plugged into a power source. In some embodiments, the embedded switch can also manage network property information, such as WiFi credentials, but in other embodiments the BMC may program the property information through a link between the BMC and the switch. In either of these two alternatives, one or more of the network adapters may be brought up and connected with the external network without reliance upon the CPU to load device drivers associated with the operating system. The computer may also communicate with external endpoints using any of the wired or wireless network adapters as discussed further in reference to FIG. 2.

In various embodiments of the edge computer, the embedded switch 40 may bundle the various wired and wireless links as a single logical entity and provide flexible failover among the links within the bundle. This bundling may be controlled in an active-standby fashion whereby only one of the links is active for sending and receiving communications at any given point in time. While there is some potential benefit to operating the bundle of links in an active-active fashion where all links are used to share the traffic and increase the total available link bandwidth, this may be impractical because the links within the bundle use distinct media (i.e., wired versus wireless) and presumably will have different speeds. Accordingly, when the active link fails, a failover may occur in an active-standby fashion between an active link and a standby link, such as between a wired link and a wireless link, or between two wireless links having different protocols (WiFi and LTE). For example, when the wired link or the WiFi link fails (i.e., the active link), the embedded switch can automatically cause communications to failover to the LTE link (i.e., a standby link), which may have a wider coverage but may be more expensive. The failover of one link to another link should not impact the workload of the CPU or the BMC, since the embedded switch will relay network communication to or from a virtual media access control (MAC) address or virtual internet protocol (IP) address. Bundling of the links provides redundancy between two links with different physical characteristics i.e. wired and wireless links, where the two interfaces (wired and wireless) employ the same virtual MAC address or virtual IP address.

In some embodiments, the wired link may be designated as the primary active link of the bundle by default. All network traffic to the computer may flow through the active link at all times. If the primary active link goes down, then the primary active link may failover to one of the standby links, which then becomes the new active link. The wired link may often be selected as the primary active link because a wired link may provide greater performance and reliability than a wireless link. However, if a given edge environment has a wireless link with greater performance and reliability than a wired link, or if the edge environment does not have a wired link, then the primary active link may be a wireless link. Although the edge computer may have multiple wired and wireless links available, those links are generally not suitable for traditional link aggregation, because link aggregation may only involve links that operate at the same speed and have the same physical characteristics.

Figure 2:
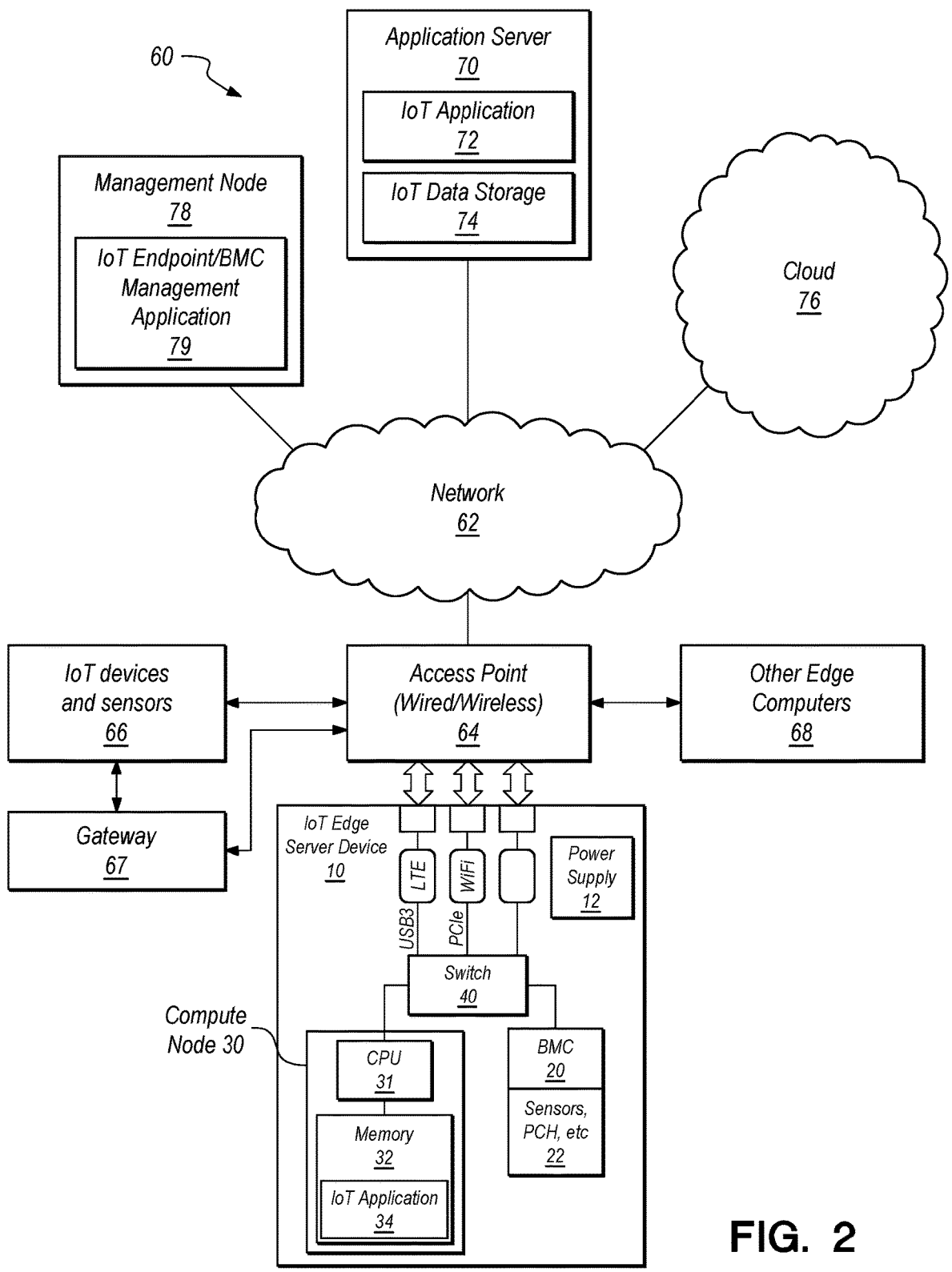
FIG. 2 is a diagram of a system that includes the IoT edge server device of FIG. 1 for performing various processes in an Internet of Things (IoT) environment.

FIG. 2 is a diagram of a system 60 that includes the IoT edge server device (or "computer") 10 of FIG. 1 for performing various processes in an Internet of Things (IoT) environment. The computer 10 may use its wired and/or wireless network adapters 52, 54, 56 to access a network 62 through a wired and/or wireless access point 64. The access point 64 may also be used to facilitate communication with one or more IoT devices and sensors 66, one or more gateways 67, and/or other edge computers 68 that may be similar or identical to the computer 10. One or more gateway 67 may aggregate information from some or all of the IoT endpoint devices 66, then communicate that information to the IoT edge server device 10 using any of the standard network protocols that are available to the IoT edge server device.

The computer 10 may communicate with the IoT devices and sensors 66 using any available wired or wireless communication media, transmission speed and protocol. Since the computer 10 includes a wireless mobile telecommunication network adapter 52, a wireless local area network adapter 54 and a wired network adapter 56, the computer 10 can communicate with any IoT device or sensor that can communicate in a manner compatible with at least one of these adapters. Similarly, the computer 10 may communicate with any of the optional other edge computers 68.

The computer 10 includes a compute node 30 having a CPU 31 with access to memory 32 that may store an IoT application 34 for handling various communications with the IoT devices and sensors 66. For example, the IoT application 34 may be executed by the processor to monitor sensor data received from the IoT devices and sensors 66. Furthermore, the IoT application 34 may be executed by the processor to provide a control signal to any one or more of the devices and sensors 66 in response to sensor data received from any one or more of the devices and sensors 66. Since the computer 10 may be located along the edge of the IoT environment or system 60, the computer 10 may monitor and process sensor data from the IoT devices and sensors 66 with low latency and high availability.

The computer 10 may also communicate over the network 62 with an application server 70 that may run an IoT application 72 and provide for IoT data storage 74. The IoT application 72 may monitor and process various IoT data and take various actions. For example, the IoT application 72 may receive sensor data directly from one or more of the IoT devices and sensors 66 or indirectly from the computer 10 or other edge computers 68. Similarly, the IoT application 72 may receive processed sensor data, such as averages, highs, lows and alerts, from the computer 10 or other edge computers 68, or notifications of actions taken by the computer 10 or other edge computers 68. The IoT application 34 run by the computer 10 at the edge of the system 60 near the IoT devices and sensors 66, and the IoT application 72 run by the application server 70 across the network 62 from the IoT devices and sensors 66, may divide up the desired data processing tasks in any suitable manner. Processing that benefits from low latency and high availability may be performed by the edge computer 10, whereas processing that does not required low latency or high availability may, in some instances, be performed by the application server 70. Still further, the system 60 may include a cloud 76, which is a shared pool of computer system resources. Accordingly, the computer system resources of the cloud 76 may supplement or substitute for the application server 70 and perform services similar or identical to the IoT application 72 and IoT data storage 74.

As discussed above in reference to FIG. 1, the management processor or BMC 20 supports remote management of the computer 10. The BMC 20, embedded switch 40, and one or more of the network adapters 52, 54, 56 receive standby power form the power supply 12 and may communicate over the network 62 even if main power to the computer is not turned on. In the system 60 of FIG. 2, the BMC 20 may communicate with a remote management node 78. The management node 78 may run an application 79, such as an IoT endpoint and BMC management application, to communicate with the BMC 20 of the computer 10 and, optionally, with other edge computers 68 and/or the application server 70. Accordingly, the remote management node 78 may apply new settings, firmware updates and the like to the BMC 20, and the BMC 20 may report operational and performance data about the computer 10 to the remote management node 78.

Figure 3:
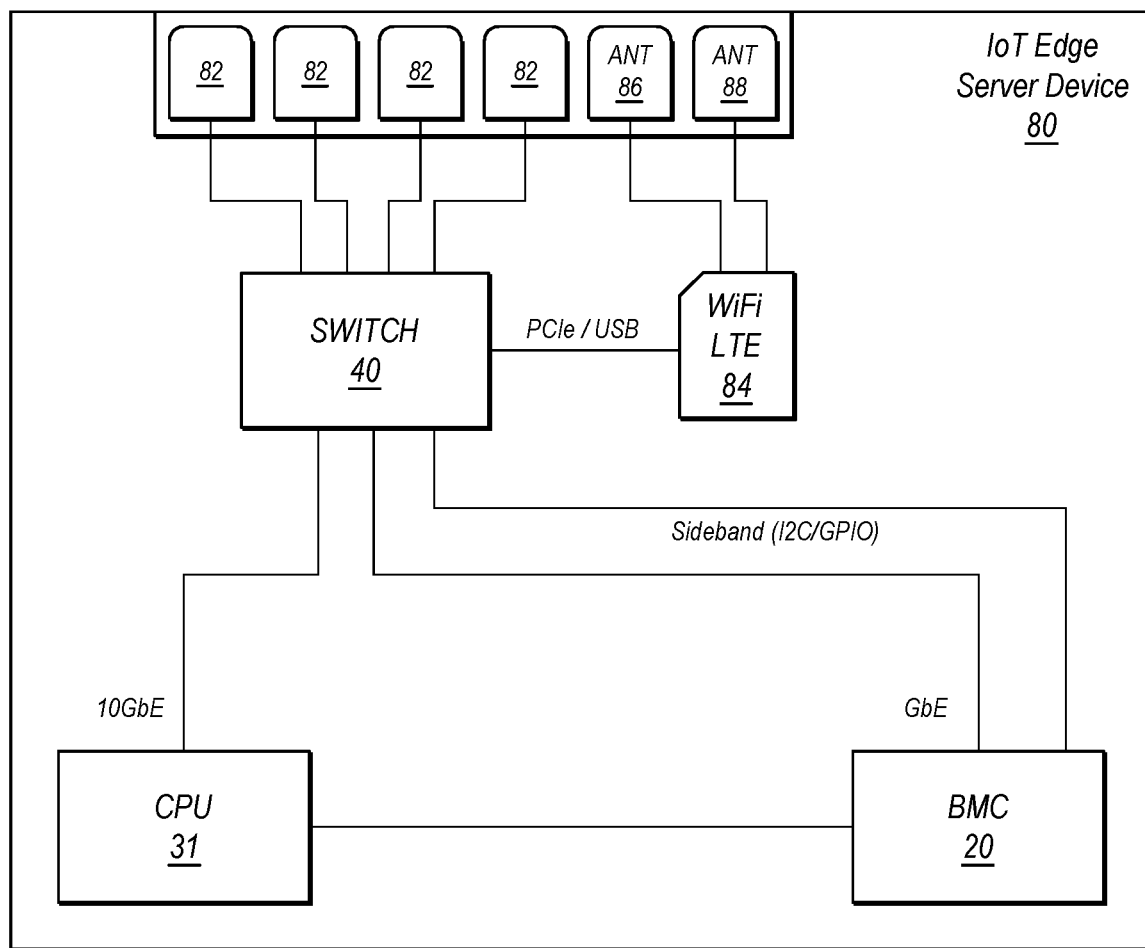
FIG. 3 is a diagram of an IoT edge server device having an embedded switch that provides a central processing unit (CPU) and a management processor, such as a baseboard management controller (BMC), with access to wired and wireless network interfaces according to some embodiments.

FIG. 3 is a diagram of an IoT edge server device (or "computer") 80 having an embedded switch 40 that provides a central processing unit (CPU) 31 and a management processor 20, such as a baseboard management controller (BMC), with access to wired and wireless network interfaces. The architecture and operation of the computer 80 may be the same as that described above for the computer 10 of FIGS. 1 and 2, except that FIG. 3 provides additional details of some embodiments. In these embodiments, the embedded switch 40 has multiple wired connectors 82, such as registered jack (RJ) connectors (i.e., RJ45 connectors) or small form-factor pluggable (SFP) connectors, to facilitate a wired link with an access point, IoT device, gateway or other edge computer. The wired network adapter functionality may be built into the embedded switch 40. A single module 84 may implement both the wireless mobile telecommunication network adapter (LTE) and the wireless local area network adapter (Wi-Fi). As shown the module 84 is coupled to the embedded switch 40 via a PCIe bus or universal serial bus (USB). Furthermore, the module 84 is connected to two antennas, such as a wireless mobile telecommunication antenna 86 and a wireless local area network antenna 88.

The BMC 20 can manage the wireless device, for example, through a software agent running on the embedded switch. In some embodiments, the BMC can access the wireless device, for example through an Inter-Integrated Circuit (I2C) bus or using a Management Component Transport Protocol (MCTP), to take an inventory of devices coupled to the embedded switch, update firmware when required, and recover to a confirmed status when a device has stopped working. However, since the switch manages network traffic through the wired and wireless links, each wireless device is visible to the system CPU. Therefore, in some other embodiments, the embedded switch may directly manage the device inventory, firmware update, and recovery functions for the wireless modules, and the BMC may indirectly manage such devices through the switch. In this design, the BMC may directly manage the power and thermal aspects of the switch through an inter-integrated circuit (I2C) bus and a general purpose input output (GPIO) pin of the BMC, and the other wireless functions can be managed indirectly via the switch.

Figure 4:
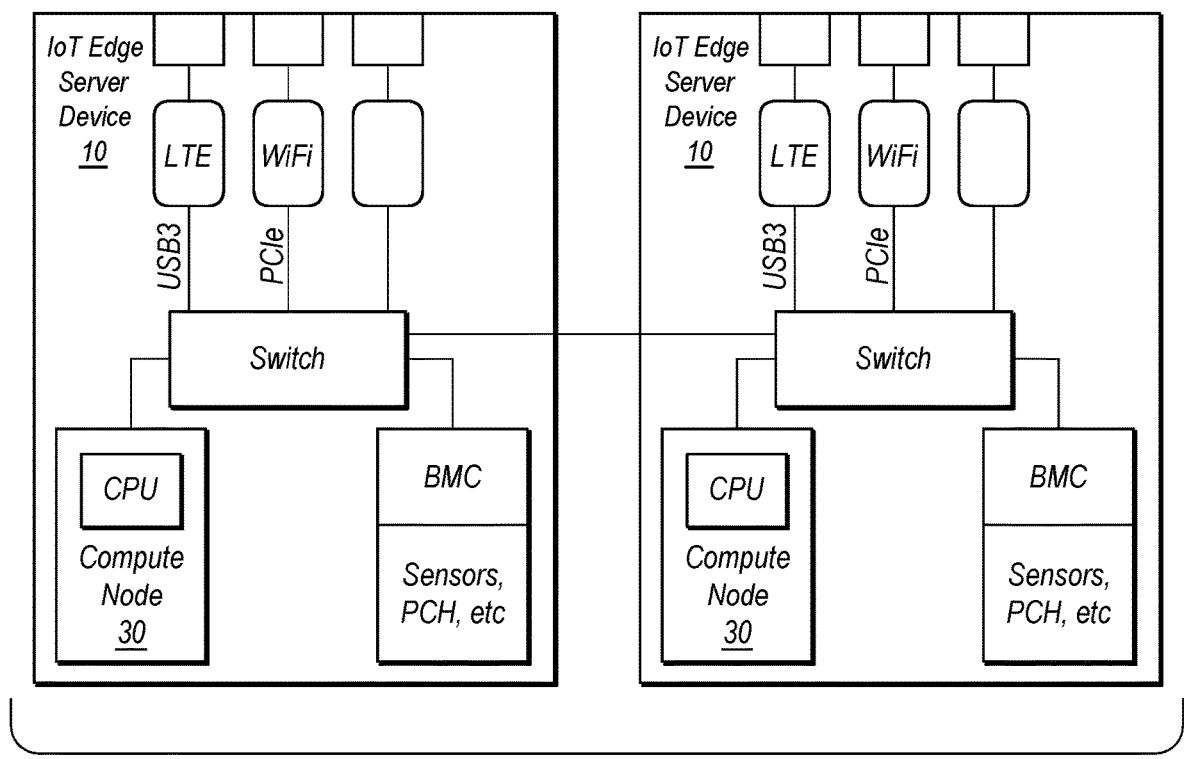
FIG. 4 is a diagram of two of the IoT edge server devices of FIG. 1 which may be logically clustered.

FIG. 4 is a diagram of two of the IoT edge server devices (or "computers") 10 of FIG. 1 which may be logically clustered. In some embodiments, multiple edge server devices may be clustered to implement a high availability (HA) protocol, such as the Virtual Router Redundancy Protocol (VRRP). During operation, it is possible that one of the clustered IoT edge server devices 10 will experience a failure of the compute node 30 or the BMC. Accordingly, when one of the clustered IoT edge server devices experiences such a failure, both the wired and wireless network connections can failover across the IoT edge server devices, where the link failover may provide a continued network connection to both the data network and the management network for both of the IoT edge server devices. The switches of the clustered IoT edge server devices may support the failover using virtual MAC addresses and virtual IP addresses.

In order to support the failover within a cluster of IoT edge server devices, the embedded switch of the failed IoT edge server device must remain operational in order to enable continued communication between the failed IoT edge server device and at least one other IoT edge server device in the same cluster. For example, in a cluster that includes a first IoT edge server devices and a second IoT edge server devices, if the CPU or compute node 30 of the first IoT edge server devices fails then the embedded switch of the first IoT edge server devices can communicate with the embedded switch of the second IoT edge server devices to report the occurrence of the CPU or compute node 30 failure. Furthermore, the BMC of the first IoT edge server devices can still communicate with the management network through the first embedded switch. Similarly, if the BMC of the first IoT edge server devices fails, the embedded switch of the first IoT edge server devices can communicate with the embedded switch of the second IoT edge server devices to report the occurrence of the BMC failure, and the CPU or compute node 30 of the first IoT edge server devices can still communicate with the data network through the first embedded switch.

If the connectivity of the clustered IoT edge server devices fails due to the failure of the active switch in a first IoT edge server devices, then a switch embedded in a second IoT edge server devices within the cluster will determine that the first IoT edge server device is down or unavailable and may take over as the active switch for the cluster. In this manner, each of the clustered IoT edge server devices other than the IoT edge server device with the failed switch will remain connected to the network. In some embodiments, the embedded switches may apply a predetermined criteria to determine which of the remaining switches in the cluster of IoT edge server devices will have higher priority to assume the role of the active switch for the cluster. Switch connectivity issues may arise from various causes, such as the active link of the active switch going down, the entire active switch going down such that all links go down, and the active switch running unstable software that prevents sending keep-alive packets.

The terms "Virtual MAC and Virtual IP" refer to logical shared resources (i.e. MAC address or IP address). In reference to FIG. 4, the two IoT edge server devices may be clustered and the cluster may be assigned a Virtual MAC address and a Virtual IP address to support network communication to and from the cluster. During network communications, the active switch of the cluster may use a virtual address as the source address, which may be shared by the two clustered IoT edge server devices. Each embedded switch within the cluster may still have its own IP address while the cluster will have a virtual IP address. Network devices outside the cluster may only be aware of the virtual IP address and may use the virtual IP address to communicate with the cluster. In some embodiments, only the active switch may send and receive packets over the network using the virtual IP address. If the active switch goes down for one reason or another, a backup/standby switch embedded in another IoT edge server device within the cluster will take over as the active switch and will then become responsive to network packets having the virtual IP address as the destination. Packets received by the active switch are then forwarded to the destination IoT edge server device using the IP address of the appropriate IoT edge server device.

Figure 5:
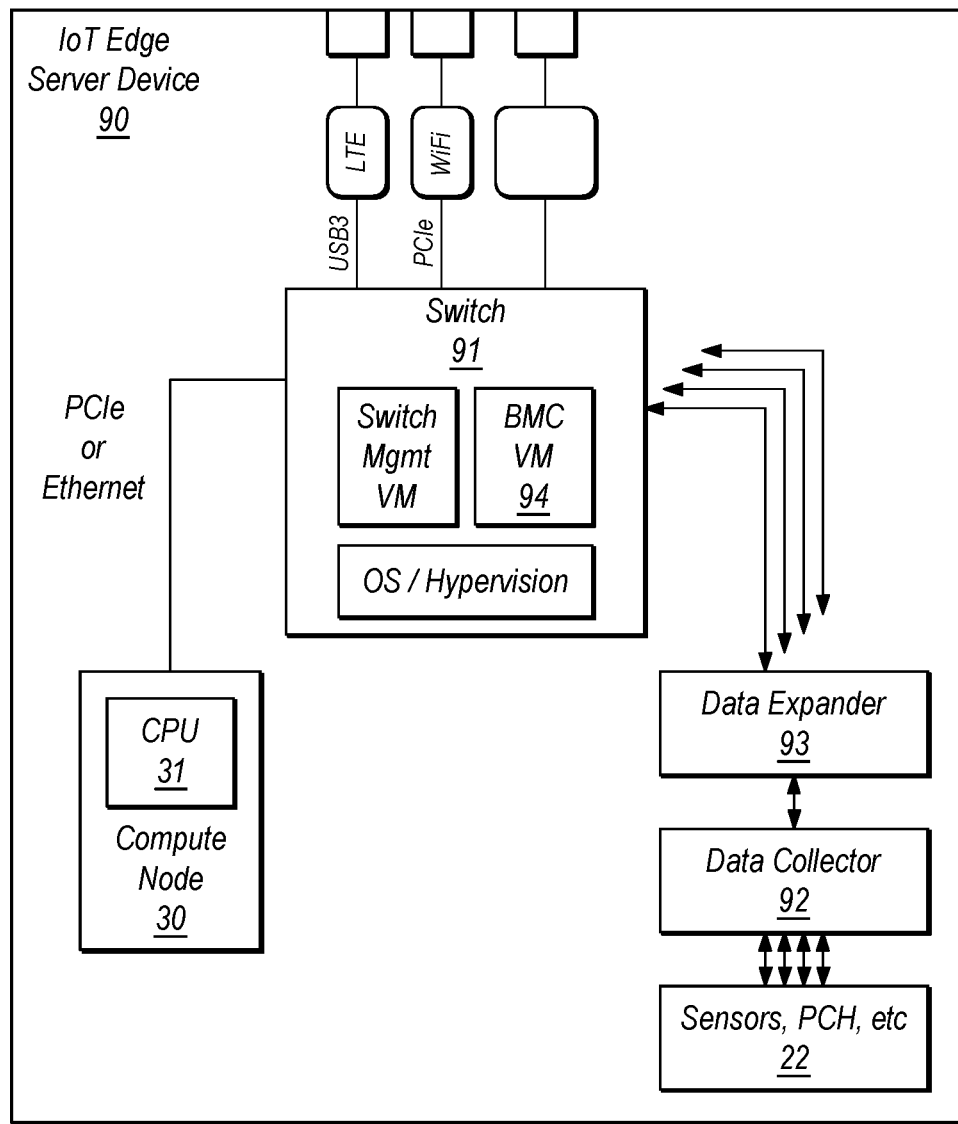
FIG. 5 is a diagram of an IoT edge server device having the functionality of a management processor, such as a baseboard management controller (BMC), implemented by the embedded switch according to some embodiments.

FIG. 5 is a diagram of an IoT edge server device (or "computer") 90 having the functionality of a management processor, such as a baseboard management controller (BMC), implemented by the embedded switch 91. In the embodiments shown, the BMC 20 that was shown in FIG. 1 has been replaced with a first field-programmable gate array (FPGA) 92 that functions as a data collector to collect data from the platform sensors 22. The first FPGA 92 forwards the data over a high speed communication link to a second field-programmable gate array (FPGA) 93 that is located physically closer to the embedded switch 91, where the second FPGA functions as a data expander to expand the link and provide the signals to the embedded switch 91. For example, the first FPGA 92 may perform packetization of the platform sensor data and the second FPGA 93 may perform depacketization of the platform sensor data. The BMC firmware code may be provided to and implement by the embedded switch 91 (e.g. as a container or a virtual machine 94), such that the management software can act with deeper knowledge of the network and the current operation of the network. For example, with the BMC functionality 94 incorporated into the embedded switch 91, the BMC functionality may take appropriate actions depending on whether a packet comes from a wired or wireless connection. Furthermore, integrating the BMC functionality into the embedded switch allows embodiments to reduce the amount of redundant management functions of the BMC and the switch. Therefore, these embodiments may be more flexible (e.g. seamless BMC wireless access), robust (e.g. wired/multiple wireless failover), network aware (e.g. BMC's function based on requesting network source), and cost efficient (e.g. BMC chip reduction).

Figure 6:
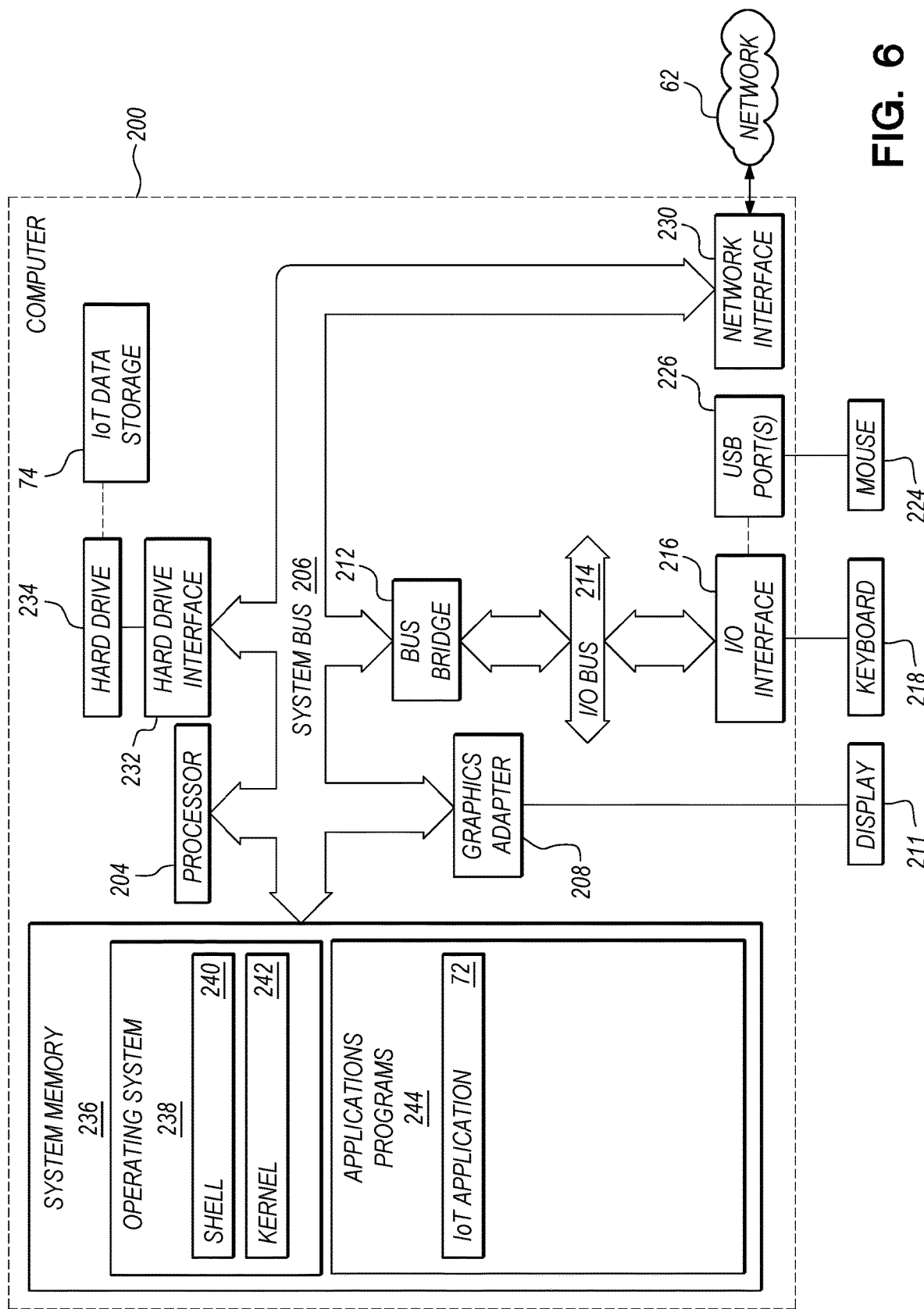
FIG. 6 is a diagram of a computer that is representative of the application server and management node of FIG. 2, and may also be representative of many aspects of the compute node.

FIG. 6 is a diagram of a computer 200 that is representative of a non-limiting example of the application server 70, management node 78 and resources within the cloud 76 of FIG. 2, and may also be representative of many aspects of the compute node 30 of the IoT edge server device 10 of FIG. 1. In the following description, the computer 200 will be described in the context of the application server 70.

The computer 200 includes a processor unit 204 that is coupled to a system bus 206. The processor unit 204 may utilize one or more processors, each of which has one or more processor cores. A graphics adapter 208, which drives/supports the display 211, is also coupled to system bus 206. The graphics adapter 208 may, for example, include a graphics processing unit (GPU). The system bus 206 is coupled via a bus bridge 212 to an input/output (I/O) bus 214. An I/O interface 216 is coupled to the I/O bus 214. The I/O interface 216 may facilitate communication with various I/O devices, such as a keyboard 218 (such as a touch screen virtual keyboard) and a USB mouse 224 via USB port(s) 226 (or other type of pointing device, such as a trackpad). As depicted, the computer 200 is able to communicate with other network devices over the network 62 using a network adapter or network interface controller 230. For example, the computer 200 may communicate with one or more edge computers and one or more IoT devices or sensors.

A hard drive interface 232 is also coupled to the system bus 206. The hard drive interface 232 interfaces with a hard drive 234. In some embodiments, the hard drive 234 communicates with system memory 236, which is also coupled to the system bus 206. System memory is defined as a lowest level of volatile memory in the computer 200. This volatile memory includes additional higher levels of volatile memory (not shown), including, but not limited to, cache memory, registers and buffers. Data that populates the system memory 236 includes the operating system (OS) 238 and application programs 244. Optionally, the hard drive 234 may include IoT data storage 74. The hardware elements depicted in the computer 200 are not intended to be exhaustive, but rather are representative. For instance, the computer 200 may include non-volatile memory and the like.

The operating system 238 includes a shell 240 for providing transparent user access to resources such as application programs 244. Generally, the shell 240 is a program that provides an interpreter and an interface between the user and the operating system. More specifically, the shell 240 executes commands that are entered into a command line user interface or from a file. Thus, the shell 240, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. Note that while the shell 240 may be a text-based, line-oriented user interface, embodiments may support other user interface modes, such as graphical, voice, gestural, etc.

As depicted, the operating system 238 also includes the kernel 242, which includes lower levels of functionality for the operating system 238, including providing essential services required by other parts of the operating system 238 and application programs 244. Such essential services may include memory management, process and task management, disk management, and mouse and keyboard management. As shown, the computer 200 includes application programs 244 in the system memory of the computer 200, including, without limitation, an IoT application 72. The computer 200 may execute and run the IoT application 72 to control communications with the edge computer and IoT devices and sensors, as well as data storage functions.

Figure 7:
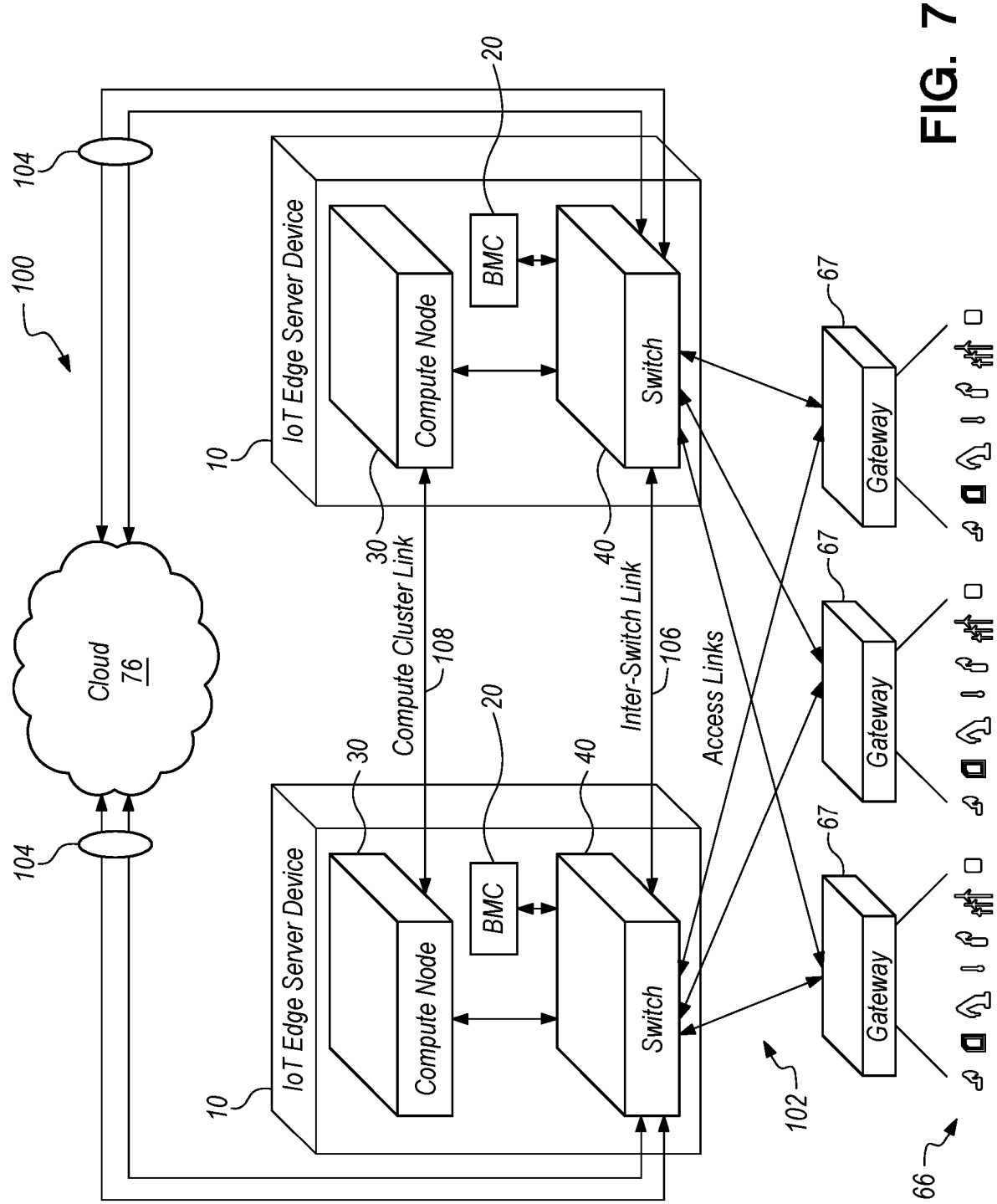
FIG. 7 is diagram of a system including a cluster of IoT edge server devices forming access links with one or more gateway devices and uplinks with a network or cloud.

FIG. 7 is diagram of a system including a cluster 100 of IoT edge server devices 10. Consistent with FIGS. 1, 2 and 4, each of the IoT edge server devices 10 includes a baseboard management controller 20, a compute node 30 and a networking switch 40. The networking switches 40 of the IoT edge server devices 10 are connected by an inter-switch link 106, and the compute nodes 30 of the IoT edge server devices 10 are optionally connected by a compute cluster link 108. While FIG. 7 illustrates a cluster 100 having two IoT edge server devices 10, the number of IoT edge server devices 10 in a cluster is not limited to two. However, each networking switch 40 in a cluster must be able to communicate with each other networking switch 40 through one or more inter-switch link 106. For example, a cluster may include three IoT edge server devices 10, where each IoT edge server device 10 includes a networking switch 40. Accordingly, the three networking switches 40 may be interconnected in a linear topology with two inter-switch links 106 or interconnected in a ring topology with three inter-switch links 106.

Consistent with FIG. 2, a gateway 67 may be used to aggregate data from IoT devices and sensors 66. As shown in FIG. 7, three gateways 67 are aggregating data from certain groups of IoT devices and sensors 66. Any number of gateways may be used to accommodate the number of IoT devices and sensors present in an IoT environment or to accommodate multiple protocols used by the IoT devices and sensors 66. For example, the IoT devices and sensors for a given system or subsystem may use a proprietary protocol developed by a given manufacturer, while the IoT devices and sensors for another system or subsystem may use a different proprietary or open source protocol. A given gateway may be dedicated to a single protocol, such that multiple gateways are necessary to aggregate data from a wide array of IoT devices and sensors that use multiple protocols. Optionally, any of the IoT devices and sensors 66 that are network compatible may communicate directly with one of the networking switches 40.

Each of the networking switches 40 may form an access link 102 with each of the one or more gateway devices 67. Furthermore, each of the networking switches 40 may form an uplink 104 with a network, application server, management node or cloud 76. Accordingly, one or more of the clustered networking switches 40 facilitate communication with one or more IoT gateway devices and one or more cloud services, while one or more of clustered compute nodes 30 may also provide local processing of data and other interactions with the individual devices or sensors 66, the gateways 67, and the cloud 76.

Embodiments of the IoT edge server device 10 may provide flexible connectivity and high availability and to support a dynamic IoT environment. Flexible connectivity is provided by each IoT edge server device supporting both wireless connectivity (e.g., WiFi, LTE, and 5G) and wired connectivity (e.g., 1 GbE) for the end-point devices, gateways and cloud. This flexible connectivity is shown in FIGS. 1-5, where the embedded networking switch 40 is coupled to multiple network adapters, such as a wireless mobile telecommunication network adapter 52, a wireless local area network adapter 54 and a wired network adapter 56. As a result, the IoT edge server device 10 may form a connection with each device across various connection types, speeds, protocols and paths. Specifically, a networking switch 40 of the IoT edge server device may form an access link 102 with a particular gateway 67 using any connection type that is supported by both the networking switch and the particular gateway. Furthermore, the connection type of an access link 102 may vary among multiple gateways connecting with a given networking switch 40.

High availability is provided by clustering two or more IoT edge server devices 10. A cluster of the IoT edge server devices provides high availability of local processing capabilities as well as high availability of networking connections. This high availability is supported by the hardware architecture of the IoT edge server devices 10 as well as by certain high availability protocols that may be implemented in the IoT edge server device. For example, one or more IoT gateways 67 may establish, or have the ability to establish as needed, an access link 102 with each of networking switches 40 in the cluster of IoT edge server devices 10. Therefore, if the compute node 30 or networking switch 40 of a given IoT edge server device 10 fails, the gateway 67 may still use an access link 102 with another networking switch 40 in the cluster in order to maintain its connection to the processing capabilities of a local compute node 30 or the cloud 76. In some embodiments, the IoT edge server device 10 implements an OSI (Open Systems Interconnection) level 2 (L2) network fabric which can significantly simplify the network configuration.

Embodiments provide high-availability at the link level and at the networking switch level through a combination of multi-homed connections from the IoT gateways to the networking switches and a clustering protocol running on the switches/routers. A multi-homed connection means that a given device (such as the gateway) has multiple local interfaces connected to the networking switches. For example, an IoT gateway may have multi-homed connections when the IoT gateway has a first gateway interface forming a connection with the networking switch of a first IoT edge server device and a second gateway interface forming a connection with the networking switch of a second IoT edge server device. Furthermore, the gateways may also have multi-homed connections towards the IoT edge server devices, and the cloud may have multi-homed connections with the cluster of IoT edge server devices. In the latter case, the cloud may have multi-homed connections when the cloud has a first interface forming a connection with a first IoT edge server device and a second interface forming a connection with a second IoT edge server device that is clustered with the first IoT edge server device. It should be recognized that references to a "connection" or to two devices being "connected" may include either or both wired and wireless connections.

Embodiments of the networking switch may form several different links, including separate links to the compute node within the same IoT server device, the management processor (such as a BMC) of the same IoT server device, the other networking switches within the cluster of IoT server devices, one or more gateways, and a cloud service or other external network resource. Each end of a link will form an interface. For example, a link between a networking switch and a gateway may involve a gateway interface at one end-point of the link and a switch interface at the other end-point of the link. Optionally, each interface may be a member of a virtual local area network (VLAN). In some embodiments, members of a first VLAN include the gateway interfaces, the switch interfaces that form a link to the gateway interfaces, the compute node interfaces, and the switch interfaces that form a link to the compute node interfaces. Furthermore, members of a second VLAN may include the management processor interfaces, the switch interfaces that form a link to the management processors, and any inter-switch links used by the management processors. Still further, members of a third VLAN may include a switch interface to the cloud and a cloud interface. The networking switches may each operate as a level 3 switch or router between the various VLANs.

Other configurations and implementations of the clustered IoT edge server devices may be utilized to advantage depending upon the needs and objectives of the IoT environment. In some embodiments, the cluster of IoT edge server devices may have a single virtual IP address, while each individual compute node may have its own IP address such that the traffic between the gateways and compute nodes may traverse the inter-switch links.

Embodiments may also implement a clustering protocol across the IoT edge server devices to further provide high-availability to a gateway device. The clustering protocol utilizes the output of the fitness protocol discussed in reference to FIG. 8.

Figure 8:
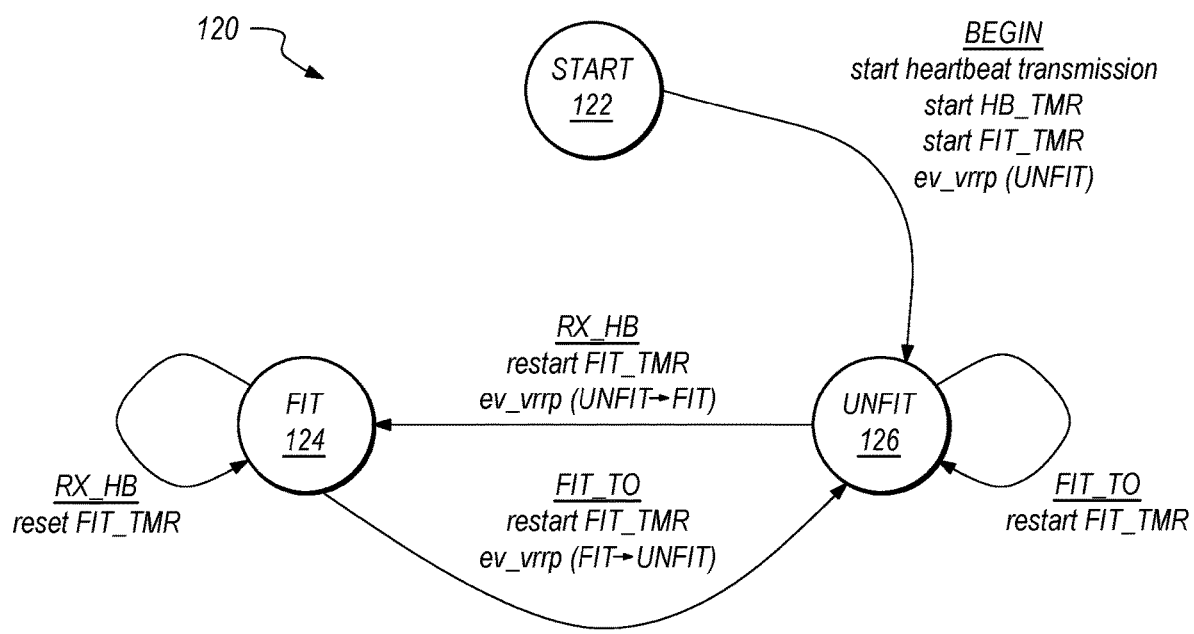
FIG. 8 is a state diagram describing a protocol run by the compute node and networking switch of an IoT edge server device.

FIG. 8 is a state diagram 120 describing a protocol run by a networking switch 40 of each IoT edge server device 10 in order to determine the fitness of the compute node 30 that has a direct local link with the networking switch. (See also FIG. 7). In reference to FIG. 7, the state diagram 120 may be referred to as describing a "fitness protocol" or "vertical protocol" since the protocol serves to assess the fitness of compute node in terms of the ability to establish bi-directional communication between the networking switch 40 and the compute node 30, where the compute node is illustrated in FIG. 7 as being vertically above the networking switch. However, it should be understood that the physical orientation or positioning of the compute node relative to the networking switch is without any limitations.

The fitness protocol may be implemented as a state machine running on the networking switch of each IoT edge server device in a cluster. Each instance of the fitness protocol operates independent of the instances of the fitness protocol running on the networking switch of each of the other IoT edge server devices in a cluster. The fitness protocol is responsible for determining whether an IoT edge server device is FIT or UNFIT. An IoT edge server device that is FIT is suitable to serve as an "active" device or node for the cluster. An IoT edge server device that is UNFIT is not suitable to serve as an "active" device and, further, is not suitable to serve as a "standby" device that could takeover as the active device if the currently active device should become UNFIT.

Embodiments of the fitness protocol described herein, such as the fitness protocol described in reference to FIG. 8, may output this fitness determination to an instance of a VRRP protocol for use by the networking switch in selecting an IoT edge server device that will be the current active device for the cluster. An instance of program instructions implementing the fitness protocol and an instance of program instructions implementing the VRRP protocol may be performed by each networking switch in the cluster. The VRRP protocol may be referred to as a "clustering protocol" or "horizontal protocol" in reference to the diagram illustrated in FIG. 7 wherein the networking switches in the cluster are arranged "horizontally." However, it should be understood that the physical orientation or relative positioning of the networking switches is without any limitations.

The fitness protocol and the fitness determination are important because, at any given time, only networking switches that are able to establish bi-directional communication with the local compute node of the same IoT edge server device are allowed to become the active networking switch of the cluster. In certain embodiments, only the active networking switch is allowed to enable access links to the gateways and enable uplinks to the cloud. Optionally, the bi-directional communication may directed over a Compute VLAN (Virtual Local Area Network) that is defined to provide connectivity from the networking switch to its local compute node.

The direct local link that connects the networking switch and the compute node may be a single Ethernet link that is completely internal to the IoT edge server device. Accordingly, the networking switch and the local compute node may each be identified by a unique 32-bit IPv4 address. A configuration file may be initially uploaded to all networking switches in the cluster, wherein the configuration file identifies the IP address of the local compute node on the direct local link. The networking switch may then use the IP address of the local compute node to send messages to the compute node. Such messages may be standard messages exchanged using standard transport protocols.

The networking switch runs one or more state machines to process events, take actions, and perform state transitions. At any given time, the networking switch will maintain a state variable (such as FIT or UNFIT) indicating whether the networking switch is able to establish bi-directional communication with the local compute node. The determination whether the networking switch is able to establish bi-directional communication with the local compute node may be performed periodically as initiated by the networking switch. Optionally, the determination may be performed at regular pre-determined time intervals, such as once each second. The time intervals may be referred to as a "heartbeat" and messages sent by the networking switch to the compute node upon expiration of each time interval may be referred to as "heartbeat messages." Furthermore, the networking switch may establish a "heartbeat transmission timer" that is set for recurring time periods of the predetermined time interval. The networking switch may then transmit a heartbeat message to the compute node at the identified IPv4 address in response to each expiration of the heartbeat transmission timer. In one example, the heartbeat message sent by the networking switch to the compute node may be an ICMP echo request packet and the reply message sent by the compute node to the networking switch may be an ICMP echo response packet.

Referring again to FIG. 8, the state machine 120 includes three protocol (logical) states shown in circles—START (122), FIT (124) and UNFIT (126). The arrows between states indicate a transition from one state to another state, where the information adjacent the arrow defines protocol events in underlined all capital letters (such as "BEGIN") and actions in italic letters (such as "start heartbeat transmission"). A special action is an event that includes a parameter enclosed within parenthesis (such as "ev_vrrp (FIT)"). Before discussing the state diagram 120, the following Protocol States, Protocol Timers and Protocol Events are defined:

Protocol States

UNFIT: The networking switch is unable to establish bi-directional communication with the local compute node.

FIT: The networking switch is able to establish bi-directional communication with the local compute node.

Protocol Timers

HB_TMR: Heartbeat transmission timer. Whenever this timer expires, the networking switch sends an ICMP echo request message destined to the IPv4 address of the local compute node.

FIT_TMR: Timer to wait for ICMP echo response messages from the local compute node.

Protocol Events

RX_HB: The networking switch received an ICMP echo response from the local compute node.

FIT_TO: The timer waiting for ICMP echo responses has expired. If no response messages are received within this timer interval, the networking switch will assume that the local compute node is unreachable.

ev_vrrp: These are outgoing events, which this state machine must generate to the virtual redundant router protocol (VRRP) that makes the active/standby determination for each networking switch.

In FIG. 8, a fitness protocol run by a networking switch is implemented as a state machine described by the state diagram 120. Note that the HB_TMR should be set for a shorter time interval than the FIT_TMR. For example, the HB_TMR may be set to 1 second and the FIT_TMR may be set for 30 seconds.

After boot, a network switch is initially in the START state 122. In response to a BEGIN protocol event, the networking switch will start heartbeat transmission, start HB_TMR, start FIT_TMR, generate the output "ev_vrrp (UNFIT)" to the VRRP protocol or horizontal protocol, and transition to the UNFIT state 126.

While in the UNFIT state 126, a FIT_TO protocol event will cause the networking switch to restart FIT_TMR. However, if the RX_HB protocol event occurs while in the UNFIT state 126, then the networking switch will restart the FIT_TMR, generate the output "ev_vrrp (FIT)" to the VRRP protocol, and transition to the FIT state 124.

While in the FIT state 124, a RX_HB protocol event will cause the networking switch to restart FIT_TMR. However, if the FIT_TO protocol event occurs, then the networking switch will restart the FIT_TMR, generate the output "ev_vrrp (UNFIT)" to the VRRP protocol, and transition to the UNFIT state 126.

In accordance with the VRRP protocol, only one networking switch in the cluster may operate as the "master" networking switch. Furthermore, a given networking switch may be only become the "master" networking switch if it is able to establish bi-directional communication with the compute node within the same IoT edge server device. For example, the fitness protocol must output an event indicating that the compute node or networking switch is FIT in order for the networking switch to be considered for selection as the "master" networking switch.

In some embodiments, the selection of one of the networking switches to be the "master" networking switch may include consideration of priority. Priority may be expressed in many ways, but embodiments may express priority using a priority number. While any priority numbering scheme may be implemented, the non-limiting embodiments of the VRRP protocol described herein assign a high "priority number" to a networking switch having a high "priority." For example, a networking switch having the highest priority may be assigned a highest priority number, such as 255. Furthermore, all of the networking switches may be given a priority by assigning a priority number to each networking switch. In the discussion of priority, if the priority is expressed as a numerical value or compared with a numerical value, then it is the priority number that is being referred to rather than the actual priority. However, in embodiments dealing with the VRRP protocol, a networking switch with the highest priority may be identifying by finding the networking switch with the highest priority number. Still further, the priority number may be expressed as a binary number or expressed using any other numeral system.

The VRRP protocol may be used to ensure that, at any given time, only a single networking switch within the cluster has its access links and cloud uplinks operationally enabled. The networking switches in a cluster are connected via inter-switch links between two inter-switch ports, such as an Ethernet port. Where an Access VLAN is defined to provide connectivity from the gateways to the cluster, the Access VLAN will include the access links and may also include the inter-switch links. For example, the inter-switch ports across the cluster may be configured as "tagged" members of the Access VLAN.

A configuration file may be initially uploaded to all networking switches in the cluster, wherein the configuration file identifies each of the networking switches in the cluster. For example, each node may be identified by a unique 32-bit IPv4 address. Furthermore, the configuration file may identify, for each networking switch in the cluster, a predetermined priority, the local IP address of the networking switch, and a virtual IP address of the cluster. Some embodiments will include two or three IoT edge server devices with their three networking switches connected by the inter-switch links, such as 1 Gbps Ethernet inter-switch links.

Some embodiments may determine a priority to be used in selecting the master networking switch by modifying or adjusting the predetermined priority. For example, if the compute node is inaccessible to the networking switch, such that the fitness protocol instance on the networking switch would output an UNFIT event, then the predetermined priority for the affected networking switch is reduced. In certain embodiments, the predetermined priority is a predetermined priority number or amount from which a predetermined amount or penalty is subtracted to reflect the reduction in priority. More specifically, a priority may be determined by the equation: Current Priority=Predetermined Priority—Predetermined Penalty Amount. If the compute node is accessible to the networking switch, then no penalty amount is subtracted such that the Current Priority equals the Predetermined Priority. Accordingly, the current priority is the amount that is used in determining which networking switch is selected to be the master networking switch for the cluster. In the non-limiting example of the VRRP protocol, priority is represented by a VRRP priority number in the range [1-255], wherein the higher the number, the higher the priority. The predetermined penalty amount may be large enough and the predetermined priority for any of the networking switches in a cluster may be of such a value that the current priority of a networking switch that is unable to establish bi-directional communication with it local compute node will prevent the networking switch from becoming the network switch. For example, if a cluster has three switches with predetermined priorities of 80, 90 and 100, then a predetermined penalty amount of 50 would cause even the networking switch with the highest predetermined priority of 100 to have a current priority (i.e., 100−50=50) that is lower than the predetermined priority of any other networking switch. If the priority has been reduced due to the fitness protocol outputting an UNFIT event, then the priority may be subsequently returned to the predetermined priority amount in response to the fitness protocol outputting a FIT event. Optionally, the VRRP protocol could be modified to indicate higher priority with a lower priority number.

An instance of the Spanning Tree Protocol (STP) may be enabled to operate within the cluster of networking switches in order to prevent network loops in case of transient periods when more than one networking switch believes itself to be the "master" networking switch. This situation may occur because it takes a non-zero amount of time for protocol events to be propagated and processed within each networking switch. This is a backup measure to ensure that the network is not overwhelmed with broadcast storms when the cluster is temporarily in some inconsistent state.

Embodiments provide the fitness determination (FIT/UNFIT state) as an input parameter to a tracking feature of the clustering protocol, such as the VRRP protocol. Some embodiments customize the VRRP protocol to accept and use the fitness determination to alter the VRRP priority that forms the basis for selecting a master networking switch or router.

An IoT gateway device may broadcast an ARP request to each networking switch in the cluster using a virtual IP (VIP) address that is, for example, a logical virtual networking switch combining each networking switch in the cluster. While each networking switch my receive the address resolution protocol (ARP) request from the gateways, only the master networking switch may respond to the ARP request. In the ARP response, the master networking switch provides the gateway with the MAC address of the master networking switch for the gateway to use as the destination address in subsequent packet headers for communicating with the cluster of IoT edge server devices. If the current master networking switch goes down (or the directly linked compute node becomes unreachable), then the other vertical/VRRP protocols lead to the selection of a new master networking switch. The new master then responds to ARP requests with an ARP response that identifies the IP address of the new master for use as the destination address in further packet headers for communicating with the cluster.

The automatic selection of a master networking switch based, at least in part, on reachability of the compute node in one of the IoT edge server devices means that the IoT endpoint devices or gateways can maintain communication with a reachable compute node, the cloud or other entities even if one of the compute nodes fails or becomes unavailable. Furthermore, the remote management capabilities of the IoT edge server devices facilitates seamless software upgrades of the compute nodes, while minimizing traffic disruption by redirecting traffic through another of the clustered IoT edge server devices.

In some embodiments, the networking switch may provide a level-3 (L3-based) network that connects the gateway(s) and the IoT edge server devices. By enabling the L3 access links of each networking switch, there may be multiple active paths for the gateway to have bi-directional communicate with the IoT edge server device cluster, including both the compute node and the networking switch of each IoT edge server device in the cluster. Furthermore, the networking switch may provide an L3 network that connects the IoT edge server devices to a cloud or other network resources. By enabling the L3 uplinks of each networking switch, there may be multiple active paths for the compute nodes to having bi-directional communicate with the cloud or other network resources. Optionally, the L3-based network may support an IP protocol over WiFi or Gb Ethernet. Still, the networking switch may be capable of both L2 bridging and L3 routing, depending upon the source or destination of the specific traffic.

Depending upon the specific implementation, the compute nodes within a cluster may be on the same or different VLANs and may have the same or different IP addresses. For example, if the compute nodes have the same VLAN and IP address, then communication with the cloud may traverse a path based on ECMP (Equal Cost Multi-Pathing) technology.

The compute node provides local processing capabilities that may not be dedicated to a particular gateway device and the limitations of a proprietary protocol implemented by the particular gateway to facilitate communication with particular IoT sensors. Furthermore, the IoT edge server device may be clustered in accordance with various embodiments in order to combine the high availability of multiple paths between the gateways and networking switches, the high availability of multiple paths between the networking switches and the cloud, and the low latency and high reliability of local processing.

As will be appreciated by one skilled in the art, embodiments may take the form of, or include, a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computer program product comprising a non-volatile computer readable medium and non-transitory program instructions embodied therein, the program instructions being configured to be executable by a processor to cause a first networking switch to perform operations comprising:
   identifying a priority of the first networking switch and a priority of at least one additional networking switch that is in a cluster with the first networking switch;
   determining whether the first networking switch is currently able to establish bi-directional communication with a local compute node through a direct local link;
   reducing the priority of the first networking switch in response to determining that that the first networking switch is currently unable to establish the bi-directional communication with the local compute node through the direct local link; and
   determining whether the reduced priority of the first networking switch is greater than a priority of each of the at least one additional networking switch in the cluster;
   operating the first networking switch as a master networking switch in the cluster in response to determining that the reduced priority of the first networking switch is greater than the priority of each of the at least one networking switch; and
   operating the first networking switch as a standby networking switch in response to determining that the reduced priority of the first networking switch is less than the priority of any of the at least one networking switch.

2. The computer program product of claim 1, the operations further comprising:
   transmitting a message from the first networking switch to the at least one additional networking switch, wherein the message transmitted to the at least one additional networking switch indicates the reduced priority of the first networking switch; and
   receiving a message from the at least one additional networking switch, wherein the message received from each additional networking switch indicates the priority of the additional networking switch from which the message is received.

3. The computer program product of claim 1, the program instructions being configured to be executable by a processor to cause the first networking switch to perform operations further comprising:
   receiving an address resolution protocol request message broadcast from a gateway device;
   sending an address resolution protocol response message to the gateway device in response to receiving the address resolution protocol request message if the first networking switch is being operated as the master networking switch in the cluster, wherein the address resolution protocol response message identifies a media access control address that the gateway device should use in a packet header as a destination address.

4. The computer program product of claim 3, the program instructions being configured to be executable by a processor to cause the first networking switch to perform operations further comprising:
sending no address resolution protocol response message to the gateway device in response to receiving the address resolution protocol request message if the first networking switch is not being operated as the master networking switch in the cluster.

5. The computer program product of claim 1, wherein the identifying of the priority of the at least one additional networking switch is performed using a virtual router redundancy protocol.

6. The computer program product of claim 1, wherein the reducing of the priority of the first networking switch comprises subtracting a predetermined number from a predetermined priority number associated with the first networking switch.

7. The computer program product of claim 1, wherein the identifying of the priority of the first networking switch and the priority of the at least one additional networking switch comprises reading a configuration file that includes a predetermined priority of each of the plurality of networking switches.

8. The computer program product of claim 1, wherein the determining whether the first networking switch is currently able to establish bi-directional communication with the local compute node through the direct local link comprises:
periodically transmitting a heartbeat request to the local compute node coupled to the networking switch through the direct local link;
starting a fitness timer in response to transmitting a heartbeat request to the local compute node;
monitoring for a heartbeat response from the local compute node on the direct local link, wherein the heartbeat response is responsive to the heartbeat request;
determining that the first networking switch is currently able to establish bi-directional communication with the local compute node through the first local link in response to receiving a heartbeat response from the local compute node before expiration of the fitness timer; and
determining that the first networking switch is currently unable to establish bi-directional communication with the local compute node through the first local link in response to expiration of the fitness timer without receiving a heartbeat response from the local compute node since starting the fitness timer.

9. The computer program product of claim 8, wherein the heartbeat request is an Internet Control Message Protocol echo request message and the heartbeat response is an Internet Control Message Protocol echo response message.

10. The computer program product of claim 8, the operations further comprising:
setting a heartbeat request transmission timer for a recurring time interval of a predetermined time duration, wherein the heartbeat request is transmitted in response to expiration of the recurring interval.

11. The computer program product of claim 10, wherein the fitness timer is set for a time duration that is greater than the predetermined time duration of the heartbeat request transmission timer.

12. The computer program product of claim 8, the program instructions configured to be executable by a processor to cause the first networking switch to perform operations further comprising:
identifying an IP address for the local compute node, wherein the heartbeat request is transmitted to the local compute node at the identified IP address.

13. The computer program product of claim 8, the program instructions configured to be executable by a processor to cause the first networking switch to perform operations further comprising:
restarting the fitness timer in response to receiving a heartbeat response from the local compute node.

14. The computer program product of claim 8, the operations further comprising:
establishing a state machine for an IoT edge server device that includes the local compute node and the networking switch, wherein the state machine maintains a current state variable comprising a FIT state that is set in response to the networking switch being able to establish bi-directional communication with the local compute node, and comprising an UNFIT state that is set in response to the networking switch being unable to establish bi-directional communication with the local compute node.

15. An apparatus, comprising:
a local compute node;
a first networking switch including a first port coupled to the compute node via a direct local link, a second port coupled to a gateway device via a first access link, and a third port coupled to a cloud via a first uplink, wherein the first networking switch is configured to perform operations comprising:
identifying a priority of the first networking switch and a priority of at least one additional networking switch that is in a cluster with the first networking switch;
determining whether the first networking switch is currently able to establish bi-directional communication with a local compute node through a direct local link;
reducing the priority of the first networking switch in response to determining that that the first networking switch is currently unable to establish the bi-directional communication with the local compute node through the direct local link; and
determining whether the reduced priority of the first networking switch is greater than a priority of each of the at least one additional networking switch in the cluster;
operating the first networking switch as a master networking switch in the cluster in response to determining that the reduced priority of the first networking switch is greater than the priority of each of the at least one networking switch; and
operating the first networking switch as a standby networking switch in response to determining that the reduced priority of the first networking switch is less than the priority of any of the at least one networking switch.

16. The apparatus of claim 15, the operations further comprising:
transmitting a message from the first networking switch to each additional networking switch in the cluster, wherein the message transmitted to each additional networking switch indicates the reduced priority of the first networking switch; and receiving a message from each additional networking switch, wherein the message received from each additional networking switch indicates the priority of the networking switch from which the message is received.

17. The apparatus of claim 15, wherein the first networking switch is configured to perform operations further comprising:
receiving an address resolution protocol request message from a gateway device;
sending an address resolution protocol response message to the gateway device in response to receiving the address resolution protocol request message if the first networking switch is being operated as the master networking switch in the cluster, wherein the address resolution protocol response message identifies a media access control address that the gateway device should use in a packet header as a destination address.

18. The apparatus of claim 17, wherein the first networking switch is configured to perform operations further comprising:
sending no address resolution protocol response message to the gateway device in response to receiving the address resolution protocol request message if the first networking switch is not being operated as the master networking switch in the cluster.

19. The apparatus of claim 15, wherein the reducing of the priority of the first networking switch comprises subtracting a predetermined number from a predetermined priority number associated with the first networking switch.

20. The apparatus of claim 15, wherein the determining whether the first networking switch is currently able to establish bi-directional communication with the local compute node through the direct local link comprises:
periodically transmitting a heartbeat request to the local compute node coupled to the first networking switch through the direct local link;
starting a fitness timer in response to transmitting a heartbeat request to the local compute node;
monitoring for a heartbeat response from the local compute node on the direct local link, wherein the heartbeat response is responsive to the heartbeat request;
determining that the first networking switch is currently able to establish bi-directional communication with the local compute node through the first local link in response to receiving a heartbeat response from the local compute node before expiration of the fitness timer; and
determining that the first networking switch is currently unable to establish bi-directional communication with the local compute node through the first local link in response to expiration of the fitness timer without receiving a heartbeat response from the local compute node since starting the fitness timer.

* * * * *